(12) United States Patent
Towles

(10) Patent No.: US 7,809,006 B2
(45) Date of Patent: Oct. 5, 2010

(54) ROUTING WITH VIRTUAL CHANNELS

(75) Inventor: Brian Patrick Towles, New York, NY (US)

(73) Assignee: D. E. Shaw Research, LLC, New York, NY (US)

( * ) Notice: Subject to any disclaimer, the term of this patent is extended or adjusted under 35 U.S.C. 154(b) by 65 days.

(21) Appl. No.: 12/190,210

(22) Filed: Aug. 12, 2008

(65) Prior Publication Data

US 2009/0046727 A1 Feb. 19, 2009

Related U.S. Application Data

(60) Provisional application No. 60/956,257, filed on Aug. 16, 2007.

(51) Int. Cl.
*H04L 12/28* (2006.01)
*H04L 12/56* (2006.01)

(52) U.S. Cl. ...................... 370/406; 370/405

(58) Field of Classification Search ................ 370/351, 370/403–409; 709/243, 241; 712/11
See application file for complete search history.

(56) References Cited

U.S. PATENT DOCUMENTS

| | | | | | |
|---|---|---|---|---|---|
| 4,933,933 | A | * | 6/1990 | Dally et al. | 370/406 |
| 5,659,796 | A | * | 8/1997 | Thorson et al. | 709/241 |
| 5,689,646 | A | * | 11/1997 | Thorson | 709/239 |
| 5,701,416 | A | * | 12/1997 | Thorson et al. | 712/11 |
| 6,055,618 | A | * | 4/2000 | Thorson | 712/11 |
| 6,249,520 | B1 | * | 6/2001 | Steely, Jr. et al. | 370/368 |
| 6,888,843 | B2 | * | 5/2005 | Keller et al. | 370/429 |
| 6,938,094 | B1 | * | 8/2005 | Keller et al. | 709/238 |
| 6,950,438 | B1 | * | 9/2005 | Owen et al. | 370/409 |
| 2003/0095557 | A1 | * | 5/2003 | Keller et al. | 370/412 |
| 2005/0201356 | A1 | * | 9/2005 | Miura et al. | 370/351 |

OTHER PUBLICATIONS

Dally, William J. and Charles L Seitz, "Deadlock-Free Message Routing in Multiprocessor Interconnection Networks," IEEE Transactions on Computers, c-36(5): 547-553 (1987).

Duato, José, "A Necessary and Sufficient Condition for Deadlock-Free Routing in Cut-Through and Store-and-Forward Networks," IEEE Transactions on Parallel and Distributed Systems, 7(8) 841-854 (1996).

* cited by examiner

*Primary Examiner*—Ayaz R Sheikh
*Assistant Examiner*—Chuong T Ho
(74) *Attorney, Agent, or Firm*—Occhiuti Rohlicek & Tsao LLP

(57) ABSTRACT

An approach to introducing adaptive routing into a communication approach for passing messages between nodes over links between the nodes includes forming virtual channels over the links of the system and defining a deterministic routing function over the virtual channels such that the deterministic routing function is deadlock free. Adaptive routing is then permitted at nodes using the existing virtual channels by introducing a constraint on the available virtual channels used to forward communication that arrives at a node for a particular destination. The constraint on the virtual channels is such that the adaptive system is also deadlock free.

16 Claims, 2 Drawing Sheets

_US 7,809,006 B2_

ROUTING WITH VIRTUAL CHANNELS

CROSS-REFERENCE TO RELATED APPLICATIONS

This application claims the benefit of U.S. Provisional Application No. 60/956,257, filed on Aug. 16, 2007, titled "Routing with Virtual Channels," which is incorporated herein by reference.

BACKGROUND

This invention relates to routing of data communication using virtual channels.

An interconnected system may include nodes and communication links joining the nodes. In general, each link between nodes may support a number of independent channels, for example, each with its own dedicated buffers and other resources. The communication approach used on the channels can involve deterministic or non-deterministic routing, such as adaptive routing. In deterministic routing, a message arriving over a channel at a node is deterministically passed to a particular outbound channel to reach its destination. For example, such deterministic routing is based on the ultimate destination node of the message. In non-deterministic routing, the choice of outbound channel may depend on (i.e., adapt to) characteristics of the system, such as the backlog in queues used to service the various channels, or otherwise follow routes that are not a deterministic function of the network topology. In some implementations, adaptive routing may provide performance advantages over deterministic routing, for example, by making better use of available resources.

In many systems an important characteristic of a communication approach for passing data between the nodes is that the system cannot reach a deadlock, which is referred to as the system being "deadlock-free." For instance, it is important that the communication requests cannot result in a situation in which resources that are required to satisfy the request cannot be freed until that same request is satisfied.

In one approach, given a set of nodes and links joining the nodes, in order to achieve deadlock-free behavior a number of channels are defined for each link, referred to as "virtual channels." A deterministic routing approach is defined on the nodes and the set of virtual channels. For particular interconnection topologies of nodes, arrangements of virtual channels to support deadlock-free deterministic routing are known or can be derived using conventional approaches. An approach to introducing virtual channels for deadlock avoidance is described in William J. Dally, "Deadlock-Free Message Routing in Multiprocessor Interconnection Networks," *IEEE Trans. on Computers*, Vol. C-36, No. 5, May 1987, pp. 547-553.

One approach to providing adaptive routing while also guaranteeing that the system is deadlock-free is described in José Duato, "A Necessary and Sufficient Condition for Deadlock-Free Routing in Cut-Through and Store-and-Forward Networks," *IEEE Trans. On Parallel and Distributed Systems*, Vol. 7, No. 8, August 1996, pp. 841-854. One approach suggested by Duato is to start with a deadlock-free routing approach and then introduce additional virtual channels, for example, by splitting each channel into a set of two channels. The additional channels are then used for adaptive routing. If all the additional channels are busy (i.e., blocked waiting for resources), then only the original channels are used.

SUMMARY

In one aspect, in general, an approach to introducing adaptive routing into a communication approach for passing messages between nodes over links between the nodes includes forming virtual channels over the links of the system and defining a deterministic routing function over the virtual channels such that the deterministic routing function is deadlock free. Adaptive routing is then permitted at nodes using the existing virtual channels by introducing a constraint on the available virtual channels used to forward communication that arrives at a node for a particular destination. The constraint on the virtual channels is such that the adaptive system is also deadlock free.

In another aspect, in general, a system having communication nodes coupled by communication links is configured according to a non-deterministic deadlock-free routing function. The non-deterministic routing function is defined according to a deterministic deadlock-free routing function that makes use of each of a set of virtual channels for passing communication over the communication links. The virtual channels have an order. The non-deterministic routing function defines permissible virtual channels for routing a message at a node according to the deterministic routing function and additional virtual channels identified according to the deterministic routing function and the order of the virtual channels.

Aspects may include one or more of the following:

The non-deterministic routing function can comprise an adaptive routing function, for example, being dependent on the state of queues in the network.

The order of the channels includes a partial order of the channels. By a partial order, we mean an order defined for some, but not necessarily all, pairs of virtual channels.

The order of the channels can be a total order, for example, defined by an integer label assigned to each of the channels, allowing at least some of the channels to share a label value.

Communication is routed according to the non-deterministic routing function. This includes accepting a message at a first node over a first virtual channel and then identifying a set of permissible next virtual channels for forwarding the message. The set includes a second virtual channel defined by the deterministic routing function for forwarding the message, and further includes a set of additional virtual channels that satisfy a constraint defined by the order of the virtual channels.

The order of the channels is defined by an ordered labeling of the channels.

The set of permissible next virtual channels is identified by identifying the set of additional virtual channels having labels lower than the label of the second channel.

One of the permissible next virtual channels is selected and the message is forwarded over the selected channel.

The system has further virtual channels that are distinct from the virtual channels used for the deterministic routing function. The non-deterministic routing function defines further permissible virtual channels for communication from the further virtual channels.

As an example, the further virtual channels are defined by a procedure described in the Duato reference discussed in the background.

In another aspect, in general, a method specifies a non-deterministic deadlock-free routing function for a communication system. The method includes providing a deterministic deadlock-free routing function defined to use each of a set of virtual channels, the virtual channels having an order. A non-deterministic deadlock-free routing function defines permissible virtual channels for routing communication at a node according to the deterministic routing function and additional virtual channels identified according to the deterministic routing function and the order of the virtual channels.

In another aspect, in general, a system includes a set of communication nodes coupled by communication links. A set of virtual channels are configured on the communication links, the virtual channels being necessary for a deterministic deadlock-free routing function for passing communication between the communication nodes, the virtual channels having an order. A communication router implements a non-deterministic deadlock-free routing function for communication over the set of virtual channels. The non-deterministic routing function defines permissible channels for routing communication at a node according to the deterministic routing function and additional virtual channels identified according to the deterministic routing function and the order of the virtual channels.

Advantages of one or more of the aspects include the following.

Adaptive routing is introduced into a communication system using the virtual channels that support a deterministic deadlock-free approach.

Additional virtual channels do not have to be added to a system where virtual channels have already been added to provide deadlock-free characteristics.

Therefore, additional resources, such as distributed or centralized queue storage is not required to enable adaptive routing.

Other features and advantages of the invention are apparent from the following description, and from the claims.

DESCRIPTION

Figure 1:
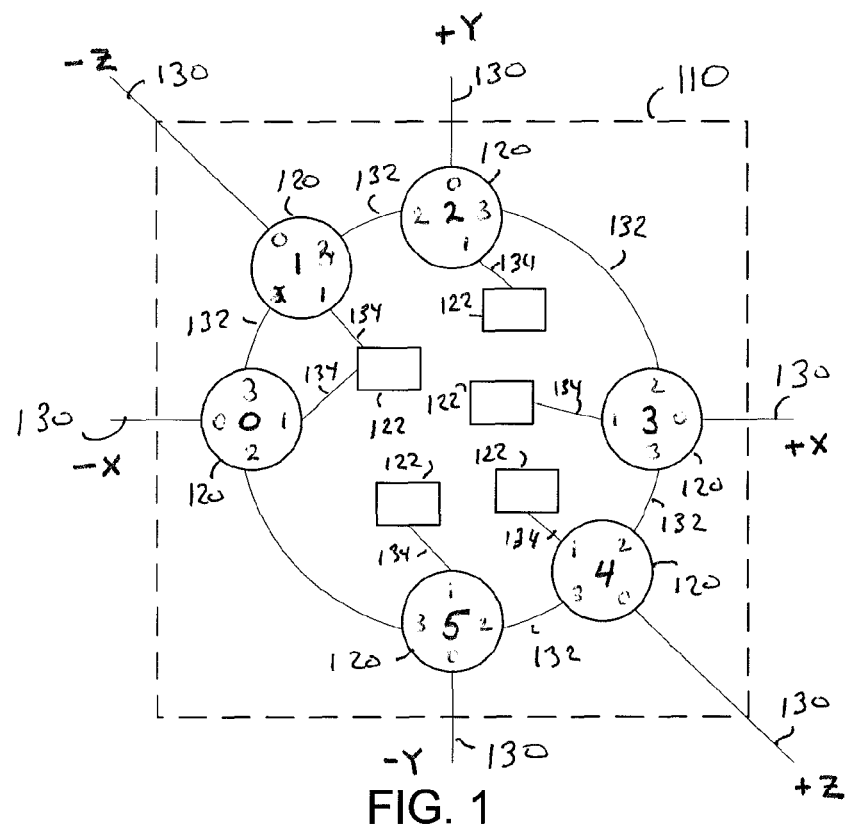
FIG. 1 is a block diagram of a system node of a multiple-node parallel computing system.

Examples of communication systems described in this document generally include network elements, referred generally as to as "nodes" or "network nodes," coupled by network links. The network elements and network links can correspond to physical elements of the system. Each of the network links is used to pass communication for one or more communication channels, which may be referred to as "virtual" channels in contrast to the "physical" links. That is, each network link can carry communication for multiple virtual channels. Communication is routed over the virtual channels according to routing function which specifies the next channel over which communication is to be passed when communication is received over a channel at a node. The routing function may be deterministic, meaning that the next channel is a deterministic function of aspects of the communication, for example, determined by the destination of the communication, the input channel over which the communication was received, and a class of the communication received. The routing function may be non-deterministic (e.g., adaptive) if the routing function specifies a set of permissible channels over which the communication may be passed, with the selection of the particular one of those channels being determined separately from the routing function. For example, the selection of channel provided by the non-deterministic routing function may be made according to heuristics that depend on factors such as the backlog on or availability of the permissible channels.

Techniques described in this document are applicable to a wide range of types of networks, including networks with various topologies. In an example illustrated in FIGS. 1 and 2, a distributed system 100 includes a number of system nodes 110 that are arranged in a three-dimensional torus (e.g., N×N×N torus with each dimension indexed from 0 to N−1), with each node having six physical communication links 130 coupling it to its six nearest neighbors in the torus. Each node 110 hosts a number of network elements, including communication nodes 120 and processing nodes 122. The communication and processing nodes within a system node are coupled by intra-node communication links 132, 134. For example, the communication nodes 120 are coupled in a ring by links 132, and each of the processing nodes 122 is coupled to one or more of the communication nodes 122 over links 134. Some of the communication nodes 120 are coupled to communication nodes at other system nodes 110 over the inter-node links 130. In the example shown in FIG. 1, each communication node 120 has four ports, labeled 0 through 3. Port 0 is coupled to a communication link 130 to a different system node (i.e., in one of the +X, −X, +Y, −Y, +Z, or −Z directions). Port 1 is coupled to an intra-node line 134 to a processing node 122. Ports 2 and 3 are coupled to the links 132 that form the on-node ring.

Figure 2:
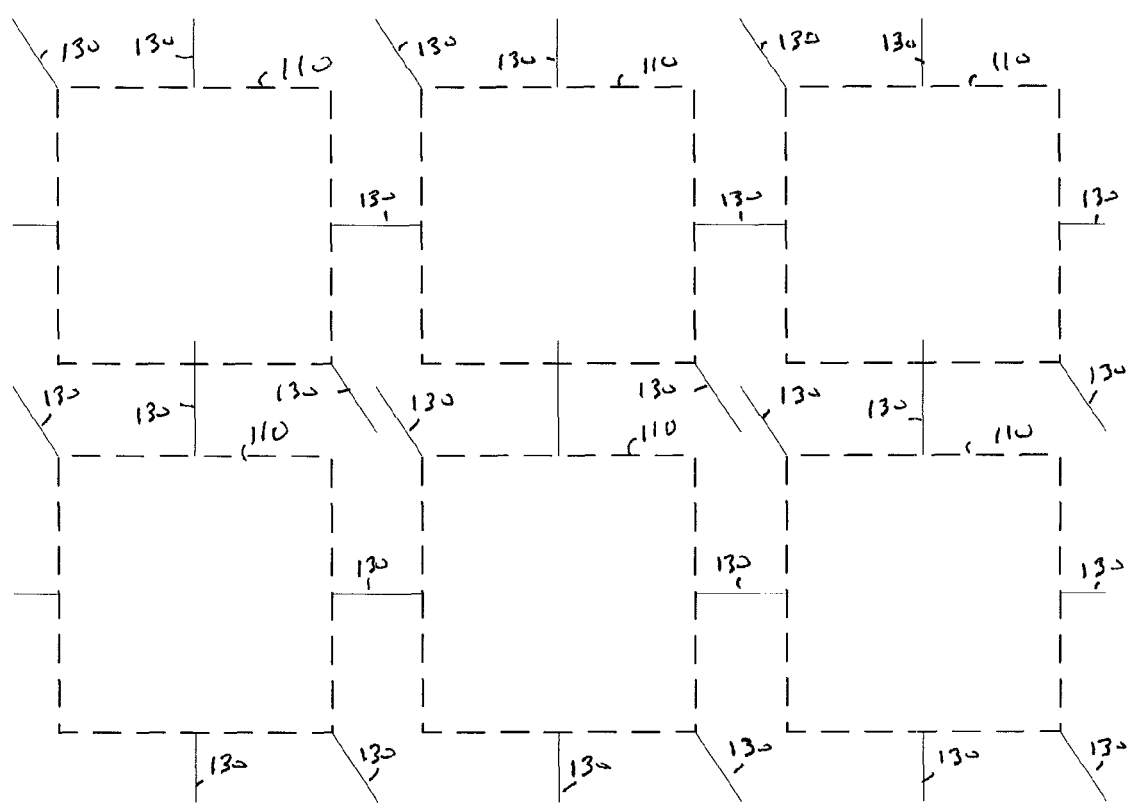
FIG. 2 is a block diagram of a portion of a three-dimensional toroidal interconnection of system nodes that form the computing system.

The arrangement shown in FIGS. 1 and 2 is similar to that used in a computing system described in a co-pending application titled "Architectures of Computation of Particle Interactions," published as PCT Application WO2007/022469 on Feb. 22, 2007. For example, the ring stations (e.g., elements 3920 in FIG. 39) in that publication generally correspond to the communication nodes 120. Examples of the techniques described in this document are applicable to the system described in the co-pending application. This co-pending application is incorporated herein by reference.

In FIGS. 1 and 2, together the network elements, which include communication nodes 120 and processing nodes 122, and links, which include the intra-node links 132 and 134 and the inter-node communication links 130, form the communication network. In some examples, the communication network supports global addressing enabling the processing elements to pass messages (e.g., data packets) to other processing elements.

Routing in the system, in general, makes use of a dimensional routing at the system node level. That is, a packet for which the source and destinations are on different system nodes is routed in one dimension (e.g., X) first, then (if necessary) along a second dimension (e.g., Y) and then along a third dimension (e.g., Z). For example, routing from node (x1, y1, z1) to (x2, y2, z2) may pass via (x1+1, y1, z1), . . . (x2−1, y1, z1), (x2, y1, z1), (x2, y1+1, z1), . . . (x2, y2, z1), . . . (x2, y2, z2). Note that along each dimension, the direction or travel may be in the positive or negative direction, and that travel may "wrap", for example, from N−1 to 0 for travel in the positive direction and from 0 to N−1 for travel in the negative direction. When a packet traverses an intermediate node, it enters the node on a link 130 arriving at port 0 of a communication node 120, and passes over one or more links 132 on the on-node ring, and then exits through port 0 of another communication node 120. For example, a packet traversing a node in the +X direction may arrive at port 0 of communication node 0, and traverse the ring to communication node 3, and exit the node through port 0 of node 3. At the first node for a packet that is destined for another node, the packet may begin at a processing node 122, pass to a communication node 120 through its port 1, and either exit the system node through port 0 of that communication node 120 or pass over the ring to another communication node before exiting the system node. At the last node for such a packet, the packet enters through port 0 of a communication node, and either passes to the addressed processing node 122 through port 1 of that communication node, or passes over the ring to another communication node before reaching the addressed processing node. A packet whose source and destination are on a single system node do not have to pass through a port 0 of any of the communication nodes.

A number of different classes of communication are defined on the network. In addition, for each link, a number of virtual channels are defined. A deterministic routing function is defined for the system using these classes of communication and virtual channels such that the system as a whole is deadlock-free. As discussed more fully below, an adaptive routing function is then defined based on the deterministic routing function. Communication is passed between processing nodes 122 via the communication nodes 120, which route the communication according to the adaptive routing function.

In one example of the deterministic routing function and associated virtual channels and communication classes, three classes of communication are defined as follows. On each link, each of the following three classes has a separate set of virtual channels.

REQUEST—packets that result in responses being returned. In the example of PCT Application WO2007/022469, these include reads, writes, particle import, and force reduction packets.

REPLY—read responses and acknowledgements of requested actions. Packets on this class are a result of a processing node responding to a request sent in the REQUEST class. Reply packets are immediately accepted by their destinations.

REQ_LOCAL_MEM—a special request class intended for use when cache misses require a local (i.e., limited to one system node) memory access. Since the processing of packets arriving at a client on the REQUEST class might be contingent on the cache miss being serviced, this separate class is used to avoid a cyclic dependency.

Deadlock avoidance in the deterministic routing function uses a "dateline" approach. Considering first the X dimension of the torus, with nodes in that dimension numbered from 0 to N−1. When a packet passes between a node at x=N−1 and a node at x=0, the virtual channel label of the packet is incremented by 1. Using dimensional routing on the torus, a packet may cross three datelines from its source system node to its destination system node. Therefore, 4 virtual channels may be used for each class of communication that passes between system nodes (that is, the two classes other than REQ_LOCAL_MEM). In some examples, in addition to incrementing the virtual channel label upon crossing the dateline in any of the dimensions, the virtual channel is incremented at the end of a dimension when the dateline was not crossed in that dimension, that is at a "corner" of the dimensional route. For example, for a packet passing from (6,1,6) to (0,3,0) on an 8×8×8 torus, the following sequence of system nodes and increments of the virtual channel label (indicated by vc++) may result: (6,1,6), (7,1,6), x-dateline vc++, (0,1,6), (0,2,6), (0,3,6), y-z-corner vc++, (0,3,7), z-dateline vc++ (0,3,0).

Figure 3:
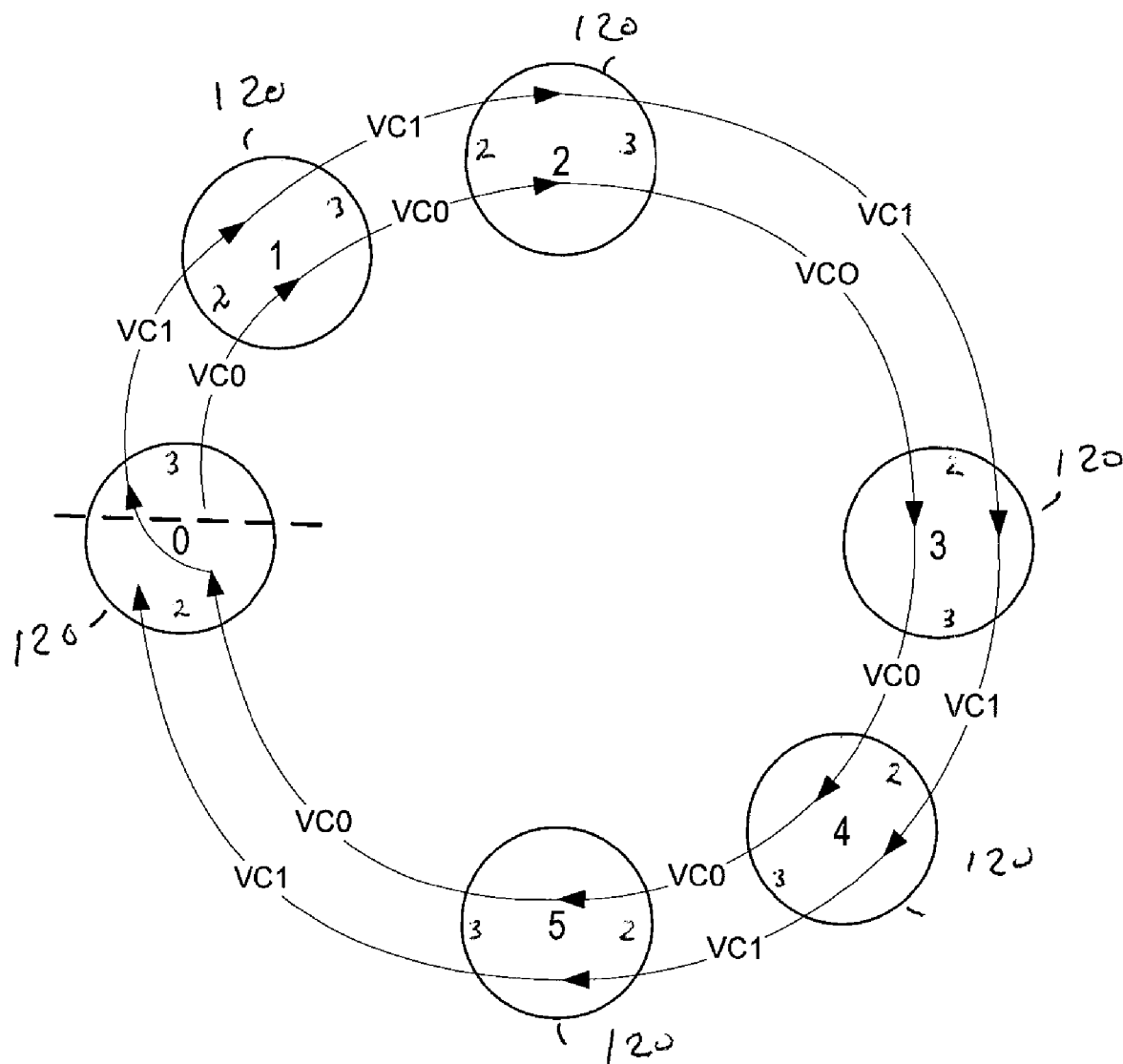
FIG. 3 is block diagram that illustrates virtual channels on a system node.

The ring structure at each system node may also introduce cyclical dependencies. Referring to FIG. 3, any packet that arrives at communication node 0 (which can be defined arbitrarily, for example, as the node over which communication arrives at the system node in the +X direction over the torus) over the ring (i.e., via ports 2 or 3) that will remain on the ring at than node (i.e., leave via ports 2 or 3) leaves node 0 after incrementing the virtual channel by 1. In FIG. 3, only virtual channels 0 and 1 are illustrated. In general, each class of communication has more than two channels as discussed below.

As an optional constraint that is used to reduce the total number of virtual channels that may be required, a packet that is routed through a system node (that is, arrives at one communication node and leaves from that or another communication node) is required not to pass through communication node 0, and therefore the virtual channel label is not incremented.

Therefore, routing of a packet from a processing node at one system node to a processing node at another system node in general includes the following steps:

a. On chip. The packet travels along a shortest path from its source processing node 122 to an inter-node channel 130 using the on-chip ring. The packet starts in the lowest numbered virtual channel for the class of communication. The direction of the packet over the ring is chosen so the resulting torus route is a shortest path. Therefore, the path may pass through the "dateline" on the ring at communication node 0 and the virtual channel number may be incremented.

b. First torus dimension. The packet travels in the ring of the first torus dimension through 0 or more intermediate system nodes. If the packet crosses the "dateline," its channel number is incremented.

c. On chip. The packet travels in the on-chip ring from the first torus dimension ring station to the second torus dimension's ring station. As an optimization, the path on the ring is constrained not to pass through node 0 (that is, the packet is not received from the ring and also forwarded along the ring at node 0). Therefore, the channel number is not incremented in this step by virtue of the packet crossing the ring-based dateline. If in step b the torus dateline was not crossed, the channel number is incremented before proceeding to step d.

d. Second torus dimension. The packet travels in the ring of the second torus dimension. The channel number is incremented if the torus dateline is crossed.

e. On chip. The packet travels in the on-chip ring from the first torus dimension ring station to the second torus dimension's ring station. The channel number is incremented if it was not incremented in step d.

f. Third torus dimension. The packet travels in the ring of the third torus dimension. The channel number is incremented if the torus dateline is crossed.

g. On chip. The packet travels in the on-chip ring from the third torus dimension ring station to the ring station of the packet's destination client. The channel number is not incremented in this step.

Therefore, there are at most four increments of the virtual channel for a packet as it passes from its source processing node to its destination processing node. Each of the first two classes of communication is assigned five virtual channels (REQUEST: 2-6; REPLY: 8-12). The REQ_LOCAL_MEM class has a single virtual channel (7), which does not introduce cyclical dependencies because the local routing is guaranteed to be shortest path on the local ring. As discussed further below, virtual channels 0 and 1 are optional and are used for adaptive routing but not required for use in the deterministic deadlock-free routing, as is discussed further below.

In this example, a deterministic routing function therefore is defined on 11 virtual channels (channels 2 through 12) passing on each physical link between communication nodes 120 on or between system nodes. The virtual channels VC over all the physical links are indexed 0, 1, 2, ..., d, ..., D−1, and each labeled with its channel number $0 \leq L(d) \leq 13$. Each virtual channel is associated with a current node x and a next node x' and a channel label l, (x→x',l). The deterministic routing function R is defined as d'=(x→x',l')=R(x, y, d) where x is the current node, y is the destination node, x' is the next node in the path, and l'=L(d') is the label of the channel number of d'. Typically, according to the steps a-g described above, the deterministic routing function R results in either l'=L(d')=L(d) or L(d)+1. Note that in some situations, the channel label may be incremented by more than 1 according to steps a-g.

The adaptive routing function $\tilde{R}$ is defined based on the deterministic routing function as follows:

$$\tilde{R}(x,y,d)=\{d''=(x\to x',l'')|l''\leq l' \text{ where } d'=(x\to x',l')=R(x,y,d)\}$$

Note that for every link x→x', there are two additional virtual channels with indices 0 and 1, which are available in the routing function set $\tilde{R}$ that were not used in deterministic routing function R. The adaptive routing algorithm can then select arbitrarily from the set $\tilde{R}(x, y, d)$, for example, based on heuristics related to the backlog in the channels. This adaptive routing approach can be generally stated as allowing a packet to use an alternative virtual channel to reach the same next node, as long as the alternative channel has a lower label than the label specified by the deterministic routing function.

Without being bound to the rationale or theory described below, the reason that this adaptive routing function does not introduce possible deadlocks is that by constraining the alternative channel labels to be lower than the deterministic routing channel, no cyclic dependencies can be introduced.

Alternative examples of this approach may introduce additional constraints. For example, transitions between virtual channels of one class of communication to virtual channels of another class of communication may be disallowed. For example, a transition from channel 12 (REPLY) to channel 8 (also REPLY) is allowed, but transition from channel 12 (REPLY) to channel 6 (REQUEST) is not allowed.

As another approach, another adaptive routing function $\tilde{R}$ can be defined to allow packets to be deflected off the route of communication nodes defined by the deterministic routing function. For example, the set $\tilde{R}(x, y, d)$ may be augmented to form a set $\tilde{R}(x, y, d)$ that includes some or all of a further set of virtual channels $$\{d''=(x\to x'',l'')|x''\neq x',l''\leq l' \text{ where } d'=(x\to x',l')=R(x,y,d)\}$$

Note that in order to avoid introducing potential deadlocks, this set may need to be further restricted, for example, such as according to a constrain imposed by the deterministic routing function R on the connectivity between x" and the ultimate destination y of the packet.

As introduced above, optional additional virtual channels 0 and 1 are introduced that are not used in the deterministic routing function R. These virtual channels are similar to those introduced in Duato's approach. In the example above, for a physical channel that already has 11 virtual channels defined on it to provide deadlock-free deterministic routing, a number (in this example two) additional virtual channels are added. Whereas Duato adds virtual channels to a deterministic deadlock-free routing function, such additional virtual channels (e.g., channels 0 and 1) are in these examples effectively added to an adaptive deadlock-free routing algorithm defined on a separate set of virtual channels (e.g., channels 2 through 12).

The general approach of ordering the virtual channels on which a deterministic deadlock-free routing function is defined, and then defining a deadlock-free adaptive routing function by limiting the alternative channels to those that are earlier in the ordering, is not limited to the examples described above. Other network topologies and other deterministic routing functions are compatible with the approaches described above.

The approaches described above are also applicable to other situations that data communication in which deadlock avoidance is required. For example, the approaches described above are applicable to other resource constrain situations in which resource assignment may cause deadlocks.

Approaches described above can be implemented in hardware, in software using instruction processors using instructions stored machine-readable form (e.g., stored in ROM), or a combination of hardware and software. The approaches are applicable to networks of various types, for example but not limited to, inter-processor computer networks, on-chip data communication networks, combinations of on-chip and inter-processor networks, local networks, and wide area networks.

It is to be understood that the foregoing description is intended to illustrate and not to limit the scope of the invention, which is defined by the scope of the appended claims. Other embodiments are within the scope of the following claims.

What is claimed is:

1. A method comprising:
configuring a system having communication nodes coupled by communication links according to a non-deterministic deadlock-free routing function,
the non-deterministic routing function being defined according to a deterministic deadlock-free routing function that makes use of each of a plurality of virtual channels for passing communication over the communication links, and
the plurality of virtual channels having an order for the virtual channels, the order of the channels being defined by an ordered labeling of the channels;
wherein the non-deterministic routing function defines permissible virtual channels for routing a message at a node according to
application of the deterministic routing function to the message, and
additional of the plurality of virtual channels identified according to the result of application of the deterministic routing function and the order for the virtual channels
routing a message according to the non-deterministic routing function, including
accepting the message at a first node over a first virtual channel;
identifying a set of permissible next virtual channels for forwarding a first communication, the set of permissible next virtual channels including
a second virtual channel defined by the deterministic routing function for forwarding the first communication, and further including a set of additional virtual channels that satisfy a constraint defined by the order of the virtual channels; and wherein identifying the set of permissible next virtual channels includes identifying the set of additional virtual channels to have labels that precede the label of the second channel according to the ordered labeling of the channels.

2. The method of claim 1, wherein the non-deterministic routing function comprises an adaptive routing function.

3. The method of claim 1, wherein the order of the virtual channels comprises a partial order of said channels.

4. The method of claim 1, wherein the order of the channels comprises a total order defined by an integer label assigned to each of the channels, wherein at least some of the channels share a label value.

5. The method of claim 1, further comprising:
selecting one of the permissible next virtual channels and forwarding the message over the selected channel.

6. The method of claim 1, wherein the system has further virtual channels that are distinct from the virtual channels used for the deterministic routing function, and wherein the non-deterministic routing function defines further permissible virtual channels for communication from the further virtual channels.

7. The method of claim 6, further comprising determining the deterministic deadlock-free routing function that makes use of each of the plurality of virtual channels.

8. A method for specifying a non-deterministic deadlock-free routing function for a communication system, the method comprising:
providing a deterministic deadlock-free routing function defined to use each of a plurality of virtual channels, the virtual channels having an order, the order of the virtual channels being defined by an ordered labeling of the virtual channels; and
specifying a non-deterministic deadlock-free routing function that defines permissible virtual channels for routing communication at a node according to the deterministic routing function and additional virtual channels identified according to the deterministic routing function and the order of the virtual channels,
routing a message according to the non-deterministic deadlock-free routing function, including
accepting the message at a first node over a first virtual channel; and
identifying a set of permissible next virtual channels for forwarding a first communication, the set of permissible next virtual channels including
a second virtual channel defined by the deterministic routing function for forwarding a first communication, and
a set of additional virtual channels that satisfy a constraint defined by the order of the virtual channels; and
wherein identifying the set of permissible next virtual channels includes identifying a set of additional virtual channels that have labels that precede the label of the second virtual channel according to the ordered labeling of the virtual channels.

9. A system comprising:
a plurality of communication nodes coupled by communication links;
a plurality of virtual channels configured on the communication links, the virtual channels being necessary for a deterministic deadlock-free routing function for passing communication between the communication nodes, the virtual channels having an order defined by an ordered labeling of the virtual channels; and
a communication router implementing a non-deterministic deadlock-free routing function for communication over the plurality of virtual channels, the non-deterministic routing function defining permissible channels for routing communication at a node according to the deterministic routing function and additional virtual channels identified according to the deterministic routing function and the order of the virtual channels, the router being configured to route messages according to the non-deterministic routing function by
accepting a message at a first node over a first virtual channel;
identifying a set of permissible next virtual channels for forwarding a first communication, the set of permissible next virtual channels including
a second virtual channel defined by the deterministic routing function for forwarding the first communication, and
a set of additional virtual channels that satisfy a constraint defined by the order of the virtual channels; and
wherein identifying the set of permissible next virtual channels includes identifying the set of additional virtual channels to have labels that precede the label of the second channel according to the ordered labeling of the channels.

10. The system of claim 9, wherein the communication router is distributed over the communication nodes.

11. The system of claim 9, further comprising data characterizing the deterministic routing function.

12. The system of claim 9, further comprising data characterizing the non-deterministic routing function.

13. The system of claim 9, further comprising data characterizing an ordered labeling of the virtual channels.

14. The system of claim 9, wherein the communication router is configured to identify a set of permissible next virtual channels for forwarding a message received at a communication node over a first virtual channel, the set including a second virtual channel being necessary for the deterministic routing function for forwarding the message, and further including a set of additional virtual channels of the plurality of virtual channels that satisfy a constraint defined by the order of the virtual channels.

15. The system of claim 12, comprising further virtual channels that are distinct from the virtual channels being necessary for the deterministic routing function.

16. The system of claim 15, wherein the communication router is configured to identify the set of permissible next virtual channels to include one or more of the further virtual channels.

* * * * *